Aug. 3, 1954

J. R. OGBORN ET AL 2,685,460

EXPANSION COUPLING

Filed Nov. 17, 1950

INVENTORS:
JAMES R. OGBORN
RICHARD SUNDSTROM
BY

*Spencer Johnston, Cook & Root*
ATT'YS

Aug. 3, 1954

J. R. OGBORN ET AL 2,685,460

EXPANSION COUPLING

Filed Nov. 17, 1950

INVENTORS:
JAMES R. OGBORN
RICHARD SUNDSTROM
BY
Spencer, Johnston, Cook & Root.
ATT'YS Patented Aug. 3, 1954

2,685,460

UNITED STATES PATENT OFFICE 2,685,460

EXPANSION COUPLING

James R. Ogborn and Richard Sundstrom, Flossmoor, Ill.; said Ogborn assignor to Automatic Bending Company, Harvey, Ill., a corporation of Illinois Application November 17, 1950, Serial No. 196,197

1 Claim. (Cl. 285—90)

This invention relates to couplings or fittings and, more particularly, to a combination coupling and expansion fitting which can be made to operate in connection with the unthreaded ends of either pipe or tubing and which can safely transmit gases and liquids under high pressures.

It has been customary heretofore to form the coupling sleeve of such couplings or fittings which receive the unthreaded ends of pipes of a casting or forging, thereupon greatly increasing the cost of manufacture. In the present case a novel form of coupling sleeve or body has been designed to enable the sleeve to be formed of ordinary standard pipe requiring no special treatment thereupon considerably reducing the cost of manufacture.

It is therefore one of the principal objects of the present invention to provide a coupling which may also be adapted as an expansion fitting wherein the coupling sleeve is formed of a standard pipe and is adapted to receive and securely hold the unthreaded ends of tubes or pipes.

Another object of the invention is to provide an expansion coupling wherein the sleeve thereof may be formed of standard pipe, and wherein the ends of the sleeve are so formed as to permit an angular alignment of the pipe being coupled thereto.

A further object of the invention is to provide a pipe coupling sleeve formed of standard pipe material wherein the ends of the pipe are threaded for a predetermined distance and the ends are then curled inwardly whereupon the inner diameter of the resulting curled portion may act as a guide for receiving pipe to be coupled thereto and the outer end of the sleeve may act as a seat for a rubber gasket for sealing the coupled pipe in place.

A still further object of the invention is to provide a coupling sleeve which may be formed of standard pipe and wherein the ends of the sleeve are so formed as to form a seat for the rubber gasket seal thus obviating the necessity of using an expensive casting and using welding, brazing or machining of another part to the sleeve since the gasket seat is formed as an integral part thereof.

Other objects and advantages of the invention will become apparent upon reading the following description taken in conjunction with the accompanying drawing in which.

Figure 1:
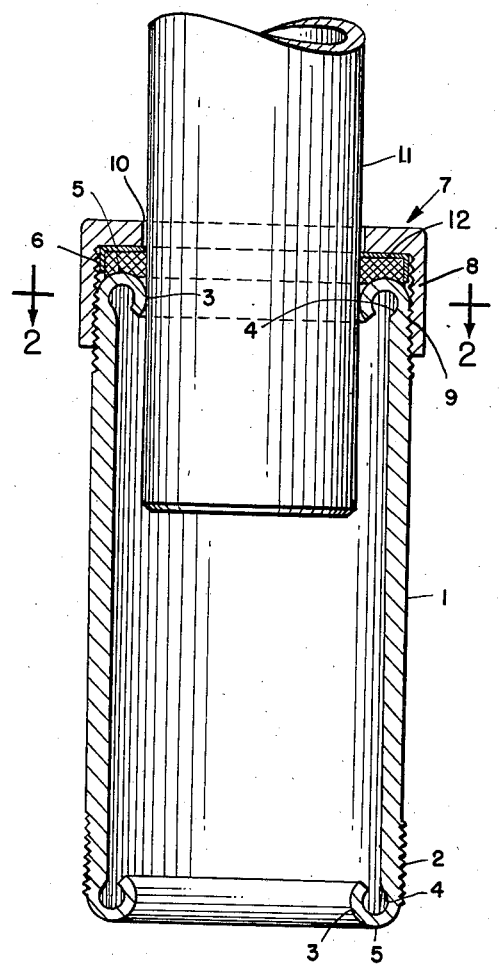
Fig. 1 is a longitudinal section through a coupling sleeve embodying the present invention illustrating at one end thereof the manner of securing a pipe thereto.
Figure 2:
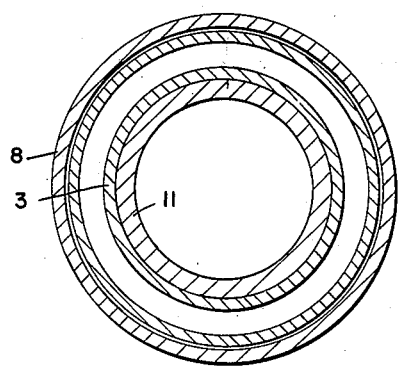
Fig. 2 is a transverse sectional view through the assembled coupling taken along the plane of line 2—2 of Fig. 1.

Referring now more particularly to the drawing, the body of the coupling for coupling sleeve 1 is formed of ordinary standard pipe requiring no special treatment. Threads 2 are provided around the outer surface of the sleeve 1 adjacent each end thereof but terminating short of the end in each case.

Each end then is provided with an inwardly curled portion 3 which is preferably curled more than 180 degrees from a transverse plane through the sleeve 1 at the point where the bend or curl begins.

In actual practice the inner surface of each end of the sleeve 1 is chamfered as at 4 so that the remainder of the sleeve outwardly therefrom at each end is thinner than the remainder of the sleeve. This specific construction has certain advantages in that it facilitates the bending or curling operation. It will be understood, however, that the thickness of the curled portion could remain the same as that of the remainder of sleeve 1 without departing from the spirit of the invention.

The curled portion 3 provides an area 5 which acts as a seat for a rubber collar or gasket 6. The gasket 6 is fitted into a nut 7 having axially extending sides 8 internally threaded as at 9 to engage the external threads 2 adjacent the end of the coupling sleeve 1. The nut 7 also has an opening 10 therethrough adapted to receive a pipe 11. It will be evident that when the nut 7 is screwed onto the sleeve 1 with the pipe 11 in place therein the pressure of the gasket 6 against the seat 5 on the inwardly curled part 3, together with the pressure of the nut against the gasket 6, will force the gasket against the pipe 11 thereby forming a fluid tight seal. When the device is used for the purpose of coupling two pipes together, then the other pipe may be inserted in the opposite end of sleeve 1 and a similar nut and gasket arrangement may be threaded thereon.

The inner diameter of the curled portion 3 is substantially equal to the outer diameter of pipe 11 which is to be inserted therein, whereupon the curled portion 3 acts as a guide for guiding the pipe inwardly. The fact that the curled part 3 extends more than 180 degrees from a transverse plane through the sleeve where the curl begins affords a substantial line contact between the inner diameter of the curled portion and the outer diameter of the pipe. The radius of curvature of the curled portion 3 is such that the outer surface of pipe 11 is spaced a considerable distance from the inner surface of sleeve 1. The spacement of the pipe from the sleeve and the line contact of the pipe with the inner diameter of the curled portion enable pipes to be inserted within the coupling sleeve 1 angularly, if necessary, thereby enabling the coupling to be used in many places where couplings or fittings heretofore known could not be used.

The construction allows for expansion of the pipe to the joint either forward or backward as required by conditions if the gases or fluids being carried by the pipes are of a harmful nature. The contact of the curled portion 3 with the outer surface of pipes 11 will prevent the fluid from reaching the gasket 6, thereby prolonging the life of the gasket. In actual practice, it may be desirable to provide a metal retaining ring 12 between nut 7 and gasket 6 for protection of the gasket.

Figure 3:
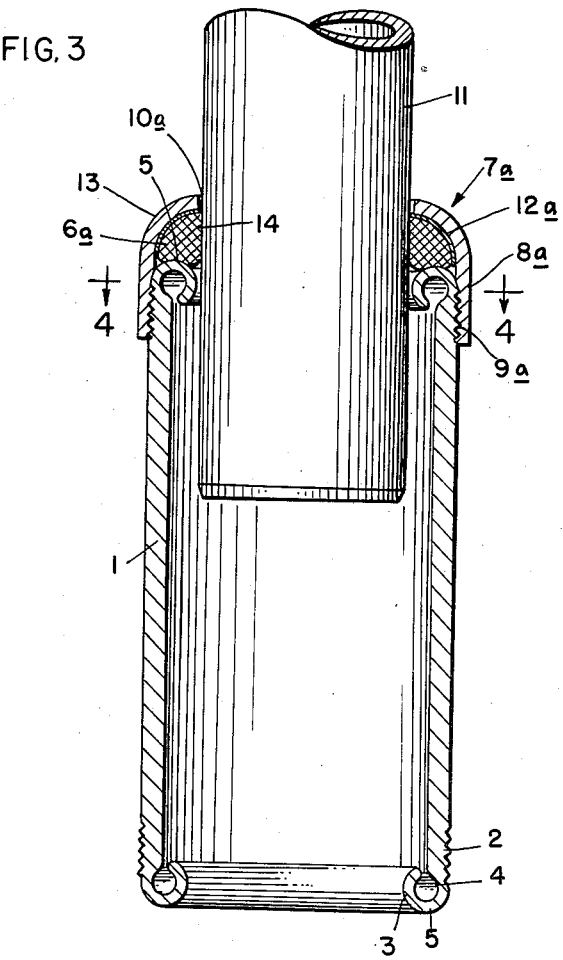
Fig. 3 is a view similar to Fig. 1, but illustrating a modified form of the invention.
Figure 4:
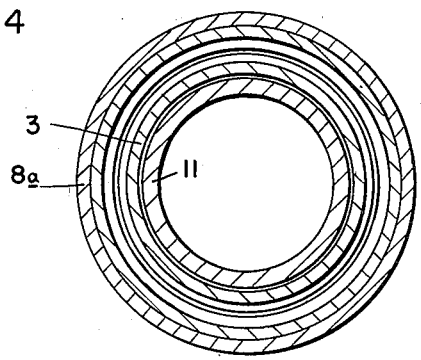
Fig. 4 is a transverse sectional view through the assembled coupling taken along the plane of line 4—4 of Fig. 3.

Figs. 3 and 4 illustrate a slightly modified form of the gasket 6, nut 7 and retaining ring 12 from that shown in Fig. 1. This latter form of the invention has certain advantages which will appear hereinafter. In referring to Figs. 3 and 4, the same numerals have been used to identify parts which are identical to those disclosed in Fig. 1.

It will thus be seen that the coupling sleeve is indicated by the numeral 1. Each end thereof is provided with threads 2, the curled portion 3, the chamfered part 4 and the area 5 which acts as a seat for the gasket.

In Fig. 1 the nut 7 is illustrated as being of the conventional type formed with a relatively square corner thereon. In Fig. 3 the nut 7a is shown as having a curved area 13 connecting the sides and end thereof. The gasket 6a which rests upon the seat 5 of the curled portion 3 likewise has an outer curved surface as shown at 14. The radius of curvature of area 14 is substantially like that of the inner surface of the curved part 13 on the nut 7a.

A retaining ring 12a is also arcuate in cross section and is adapted to be disposed between the outer curved surface 14 of the gasket 6a and the inner curved surface of the area 13 on the nut. The nut 7a has an opening 10a adapted to receive the pipe 11.

The advantages of this construction will be readily apparent when it is understood that application of the nut 7a as it is screwed toward the end of sleeve 1 will exert a force against the gasket 6a in two directions. One component of the force will be against the seat 5 on the curled part 3 and the other component of force will be in a direction radial to that of the pipe 11. The result will be a forcing of the gasket 6a into sealing engagement with both the seat 5 and pipe 11.

The advantage of this result in actual practice is that the nut in the construction of Fig. 3 may be tightened by hand and will require a greater amount of loosensing before leakage will occur than will the structure of Fig. 1. It is to be assumed that the person installing the coupling will use a wrench to tighten the nuts, and if this is done the advantages of both structures will be as set out hereinabove. The structure of Fig. 3, however, adds a safety feature to the extent that if the nut is tightened by hand, it is equivalent to tightening the structure of Fig. 1 with a wrench. The structure of Fig. 3 may be said to create a tighter seal as between the gasket and pipe 11 by reason of the radial force exerted against the gasket due to the curvature of its outer surface. Thus, if for any reason the nut 7a is inadvertently loosened the extent to which it must become loosened in order to create leakage is greater than that for the structure shown in Fig. 1.

The sleeve 1, together with its component parts as above described, has additional advantages over those couplings which are now customarily cast or forged in that the cost of production is greatly reduced. This decreased cost is due primarily to the fact that the sleeve may be formed of ordinary standard tubing and, therefore, requires no complex machining operation. The inwardly curled portions 3 at each end of the sleeve each provides a seat for the rubber sealing gasket 6 without the necessity of having an expensive casting or the securing of another part to the tubular sleeve to provide the seat. The device of the present invention also has certain advantages over couplings heretofore known in that there need be no reliance on the compression or deformation of metal to form the seal since the seal is formed by the gasket 6.

The coupling can be quickly and easily disassembled since there is no distortion of mechanical parts and the sleeve can be assembled with the pipe sections in such a position that they cannot be pulled apart for the purpose of applying the coupling. This latter fact is due to the permissive angularity at which the pipe may be disposed with respect to the coupling sleeve when it enters the sleeve.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

An expansion coupling assembly comprising a length of pipe having an integral end portion reduced in wall thickness and inwardly curled back on itself more than 180° on an arc of relatively small radius, the innermost portion of the curl being of less internal diameter than the adjacent part of the pipe thereby to provide a first annular guide adapted to receive a connecting pipe, external threads on said pipe adjacent the inwardly curled end thereof, the root diameter of said threads being greater than the diameter of the curl, a coupling nut engaging over the curled end of the pipe, said nut having an internally threaded cylindrical skirt portion threadedly engaging over the external threads of said pipe and an integral, substantially dome-shaped portion of substantially concavo-convex configuration in cross section with an axial opening through the dome thereof of a diameter substantially equal to the internal diameter of the first annular guide, whereby to provide a second annular guide in axially spaced alignment with the first guide and adapted to receive the connecting pipe, and an annular gasket of yieldable material engaging between the inwardly curled end portion of the pipe and the inner side of the dome portion of the nut, said gasket having an outer surface substantially complementary with the inner side of said dome-shaped portion whereby tightening down of said nut over the curled end portion of the pipe will urge said gasket in an axial direction against said curl and radially inward against the connecting pipe for forming a seal therewith.

References Cited in the file of this patent

UNITED STATES PATENTS

| Number | Name | Date |
|---|---|---|
| 381,916 | Dresser | May 1, 1888 |
| 602,756 | Hoard | Apr. 19, 1898 |
| 2,078,465 | Smith | Apr. 27, 1937 |
| 2,250,477 | Fleischman | July 29, 1941 |
| 2,358,408 | McMurray | Sept. 19, 1944 |
| 2,578,933 | Hunter et al. | Dec. 18, 1951 |